United States Patent
Stitser

(10) Patent No.: US 7,992,258 B1
(45) Date of Patent: Aug. 9, 2011

(54) CUSTOMIZED SPORTS SAFETY GRIPS

(76) Inventor: Catherine Stitser, Reno, NV (US)

( * ) Notice: Subject to any disclaimer, the term of this patent is extended or adjusted under 35 U.S.C. 154(b) by 381 days.

(21) Appl. No.: 12/355,083

(22) Filed: Jan. 16, 2009

(51) Int. Cl.
A45C 13/26 (2006.01)
B25G 1/10 (2006.01)

(52) U.S. Cl. ............. 16/430; 16/111.1; 16/421; 16/422; 16/903

(58) Field of Classification Search ................. 16/110.1, 16/111.1, 420, 421, 430, 431, DIG. 12; 30/122, 30/125, 134, 164.5, 514, 517; 81/177.1, 81/177.4, 489, 490; 44/530, 531, 540, 541; 116/63 P, DIG. 40; 362/109, 119, 114, 190, 362/191, 202
See application file for complete search history.

(56) References Cited

U.S. PATENT DOCUMENTS

| | | | |
|---|---|---|---|
| 2,473,158 A | 6/1949 | Leukens, Jr. | |
| 2,651,106 A * | 9/1953 | Breitzke | 30/125 |
| 2,681,505 A * | 6/1954 | Flanagan | 30/125 |
| 4,023,817 A | 5/1977 | Lah et al. | |
| 4,111,444 A | 9/1978 | Clements, Jr. | |
| 4,206,445 A * | 6/1980 | Steinhauer | 340/321 |
| 4,229,015 A | 10/1980 | Ramsey et al. | |
| D286,271 S | 10/1986 | Buch | |
| 4,669,186 A * | 6/1987 | Liu | 30/125 |
| 4,670,988 A * | 6/1987 | Baxter | 33/333 |
| 4,751,621 A * | 6/1988 | Jenkins | 362/119 |
| 4,930,810 A * | 6/1990 | Addison, Jr. | 280/821 |
| 5,303,954 A * | 4/1994 | Suda | 280/819 |
| 5,611,615 A * | 3/1997 | Jang | 362/119 |
| 6,388,612 B1 * | 5/2002 | Neher | 342/357.54 |
| 6,772,778 B2 | 8/2004 | Morosini et al. | |
| 2002/0158766 A1 * | 10/2002 | Lentine et al. | 340/573.6 |
| 2004/0196156 A1 * | 10/2004 | Wilker et al. | 340/691.1 |
| 2006/0292997 A1 * | 12/2006 | Yang | 455/90.3 |

* cited by examiner

Primary Examiner — Chuck Y. Mah
(74) Attorney, Agent, or Firm — Kyle Fletcher

(57) ABSTRACT

The invention is a sports safety grip for use with ski poles, hiking poles, bicycle grips, or motorcycle grips that have internal threading upon each end leading into a hollow chamber. A corresponding tool with external threading can be screwed onto the handle grip and includes a tool comprising a tracking device, compass, and a plurality of tools.

14 Claims, 4 Drawing Sheets

CUSTOMIZED SPORTS SAFETY GRIPS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of sports safety grips, more specifically, a pair of grips having a tracking device, compass, and screwdriver.

B. Discussion of the Prior Art

As a preliminary note, it should be stated that there is an ample amount of prior art that deals with sports grips. As will be discussed immediately below, no prior art discloses a pair of sports grips for use with ski poles, hiking sticks, bicycle handle bars, or motorcycle handle bars, and of which include a plurality of safety articles comprising a tracking device, compass, and screwdriver.

The Leukens, Jr. U.S. Pat. No. 2,473,158 discloses a ski pole in which a cap on the handle is unscrewed to access a storage compartment within the handle. However, the device is limited to a ski pole and does not depict the storage compartment being used to store a tracking device, compass, screwdriver, or other tool for that matter.

The Lah et al. U.S. Pat. No. 4,023,817 discloses a ski pole with an electronic emergency audible or visual alarm housed within the handle. However, the handle is directed to a ski pole and does not support a compass, screwdriver, or tracking device.

The Clements, Jr. U.S. Pat. No. 4,111,444 discloses a pole for stabilization during skiing, which has an electronic clock and timing device that is threaded onto the end of the handle. However, the handle or grip does not include a tracking device, compass, screwdriver, or other tool.

The Morosini et al. U.S. Pat. No. 6,772,778 discloses a multi-functional walking stick that houses survival tools such as knives, matches, and other devices within the hollow chamber of the handle. However, the device is directed to a walking stick and not a pair of sports safety grips that have a plurality of safety tools integrated therein.

The Ramsey et al. U.S. Pat. No. 4,229,015 discloses a pole for skiing that has a hollow chamber within the handle adapted to be filled with a liquid or other survival objects. However, the device is directed to be used as a ski pole and not a sports safety grip that has a plurality of safety tools.

In light of the above discussed prior art there is a need for a pair of sports safety grips that have a plurality of safety tools integrated therein comprising a compass, tracking device, or screwdriver.

SUMMARY OF THE INVENTION

The invention is a sports safety grip for use with ski poles, hiking poles, bicycle grips, or motorcycle grips that have internal threading upon each end leading into a hollow chamber. A corresponding tool with external threading can be screwed onto the handle grip and includes a tool comprising a tracking device, compass, or removable screwdriver tool. The compass may include a removable magnifying lens that would be used to start fires in emergency situations.

An object of the invention is to provide a pair of sports safety grips that can be used with ski poles, hiking poles, bicycle handle bars, or motorcycle handle bars.

A further object of the invention is to include a plurality of safety tools comprising a tracking device, compass, screwdriver, or other safety tool.

These together with additional objects, features and advantages of the customized sports safety grips will be readily apparent to those of ordinary skill in the art upon reading the following detailed description of presently preferred, but nonetheless illustrative, embodiments of the customized sports safety grips when taken in conjunction with the accompanying drawings.

In this respect, before explaining the current embodiments of the customized sports safety grips in detail, it is to be understood that the customized sports safety grips is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the customized sports safety grips.

It is therefore important that the claims be regarded as including such equivalent construction insofar as they do not depart from the spirit and scope of the customized sports safety grips. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
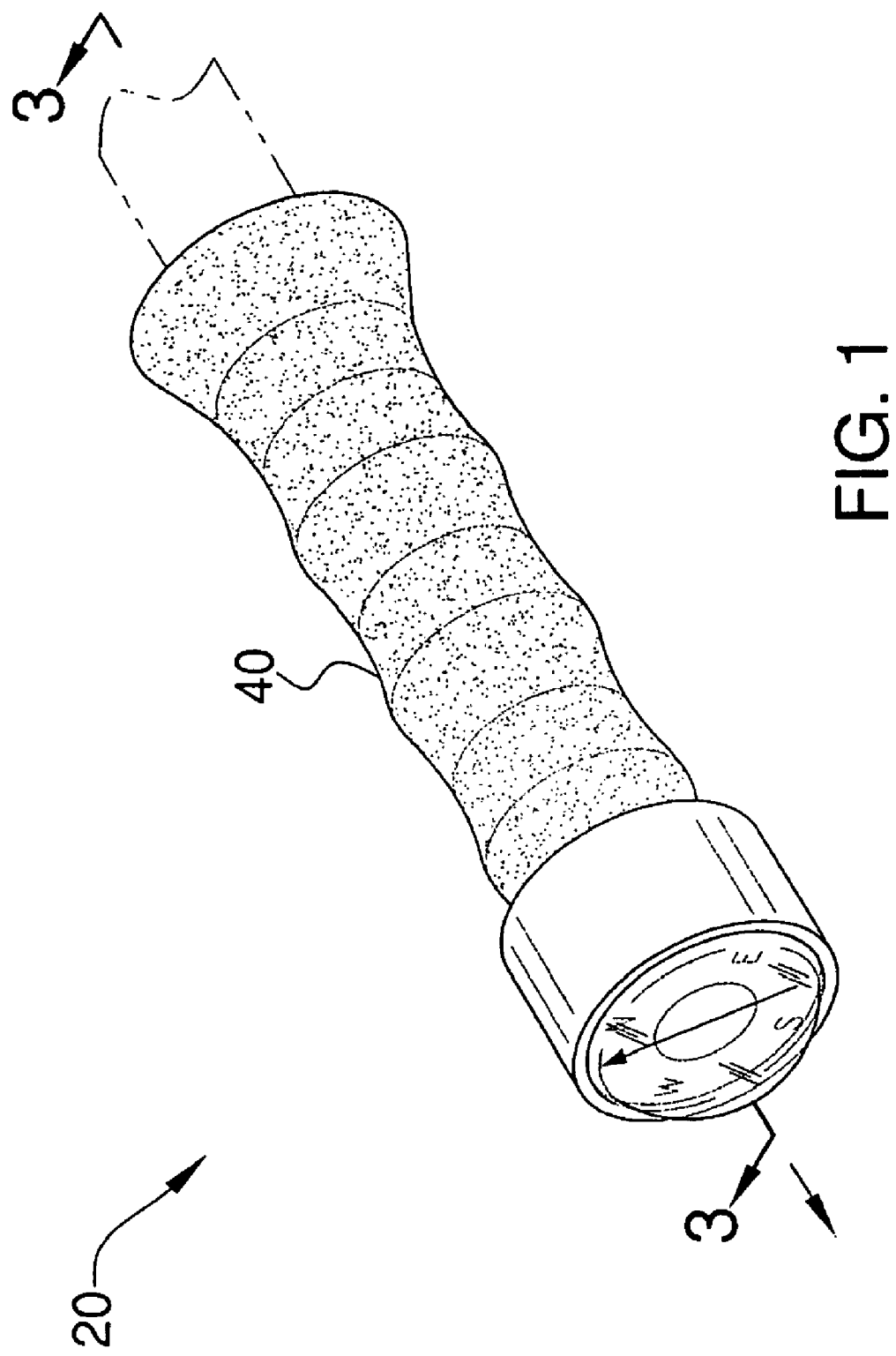
FIG. 1 illustrates an isometric view of the grip with a compass and the tracking device concealed within.
Figure 2:
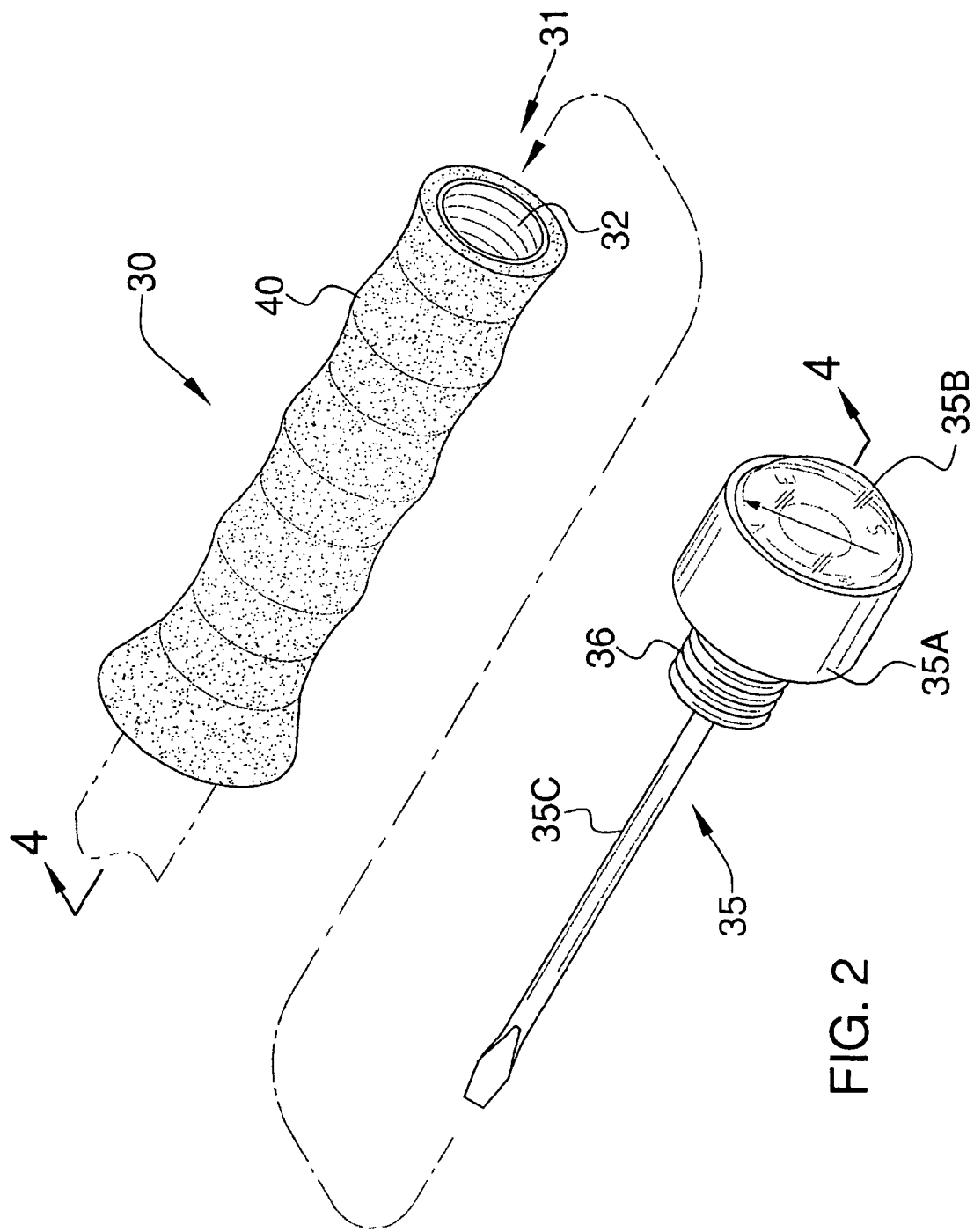
FIG. 2 illustrates an exploded view of the grip with the compass removable tool assembly removed and a flat-head screwdriver attached.
Figure 3A:
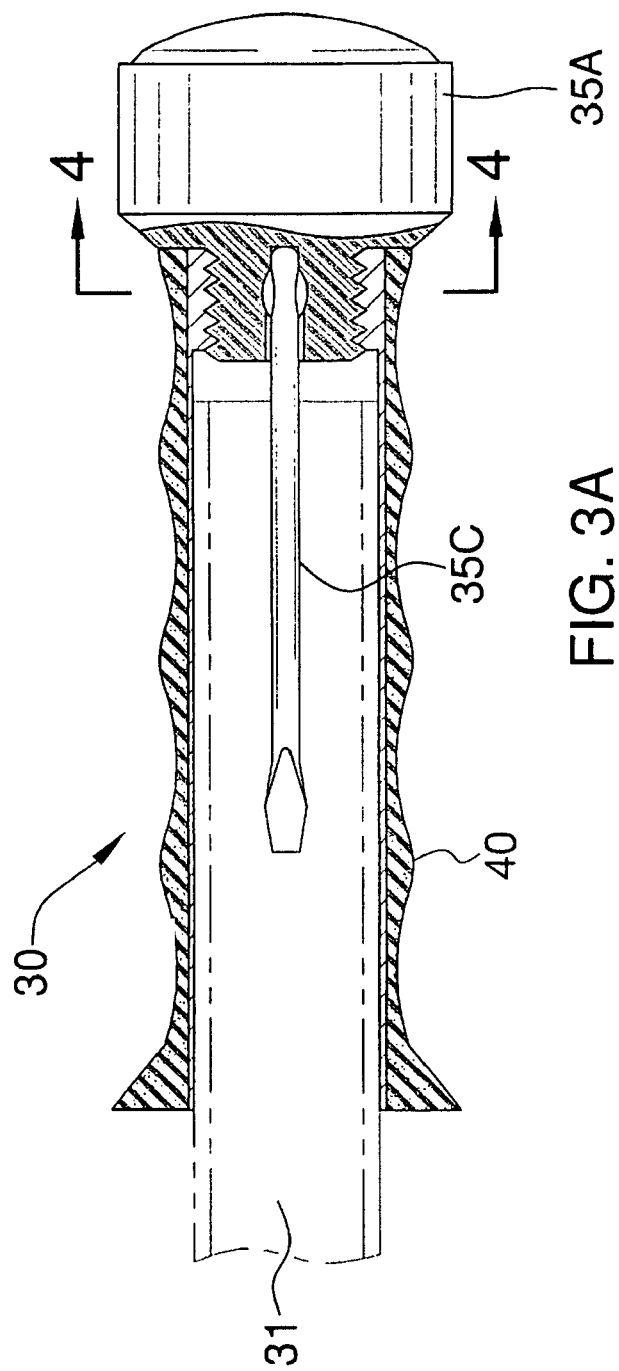
FIG. 3A illustrates a cross-sectional view of the grip with the compass removable tool assembly along line 3-3 in FIG. 1.
Figure 4:
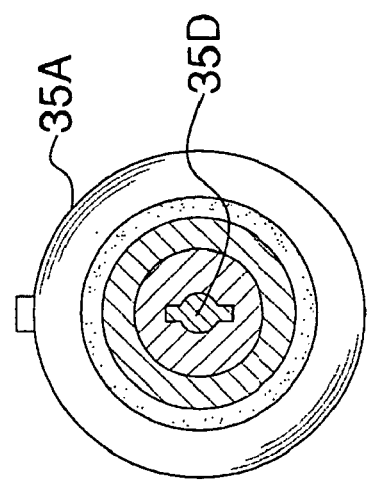
FIG. 4 illustrates a cross-sectional view of the grip along line 4-4 in FIG. 3A.
Figure 3B:
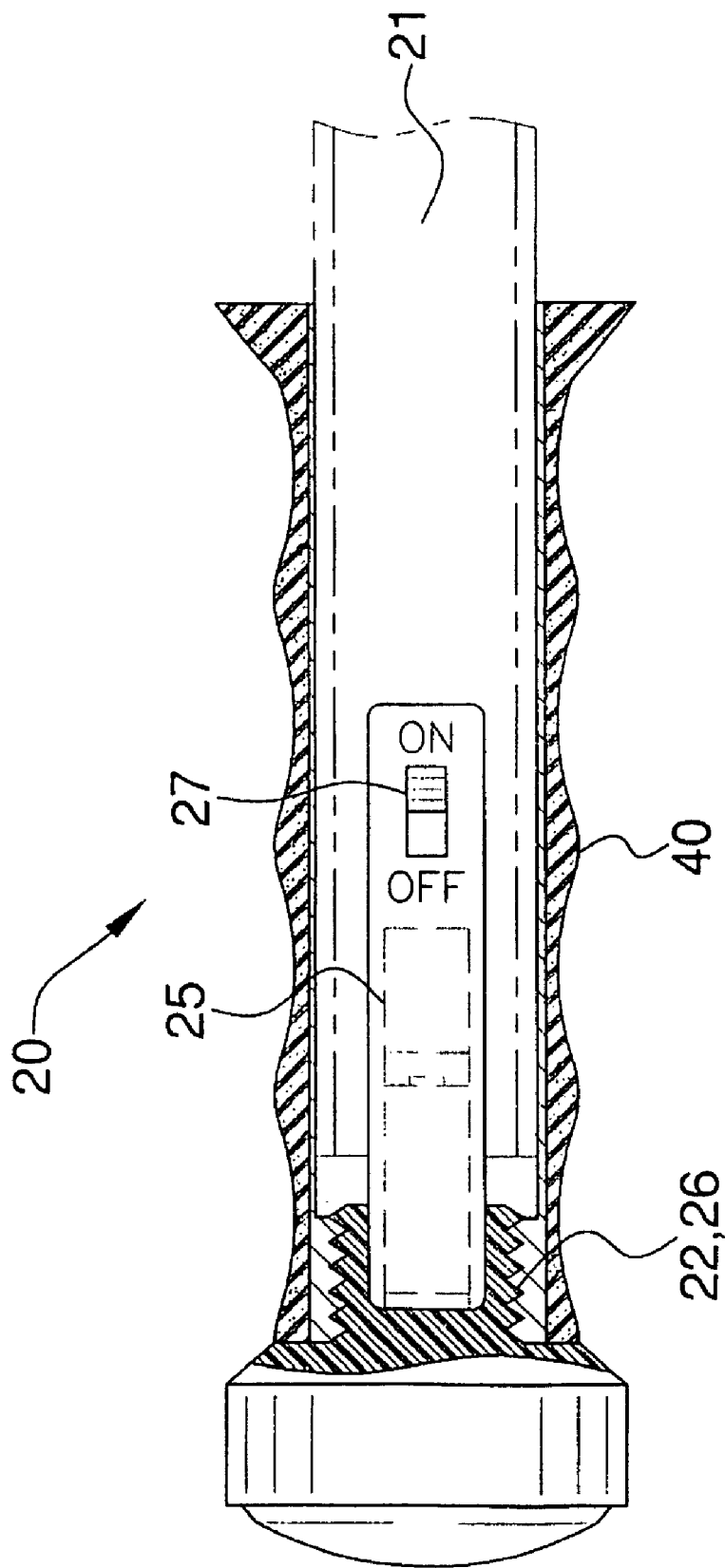
FIG. 3B illustrates a cross-sectional view of the grip with the tracking device.

Detailed reference will now be made to the preferred embodiment of the present invention, examples and applicable uses of which are illustrated in FIGS. 1-4. A customized sports safety grips 20 or 30 (hereinafter invention) includes a compass tool assembly 35.

The safety grip 20 has a grip 40 and a hollow chamber 21 that is lined along the top with internal threading 22. The compass tool assembly 35 has external threading 26, which corresponds with the internal threading 22 of the hollow chamber 21. The tracking device 25 has a battery compartment (see 25 in FIG. 3B) an on/off switch 27 in order for the tracking device 25 to be operated. It shall be noted that the tracking device 25 shall be capable of emitting a signal that would be the universal signal that emergency personnel monitor.

The safety grip 30 has a hollow chamber 31 and is lined with internal threading 32. A compass-tool assembly 35 has external threading 36 that corresponds with the internal threading 32 of the grip 30.

The compass-tool assembly 35 includes a compass 35A, a removable magnifying lens 35B, and a plurality of removable tools 35C. The removable tools 35C fit into a tool socket 35D on the compass-tool assembly 35. The magnifying lens 35B is stored over the compass 35A and can be used to start fires in emergency situations.

The plurality of removable tools 35C comprise an ice pick, magnesium fire starter, knife, saw, glow stick, flash light, mini flare, whistle, or screwdriver (as shown). The plurality of removable tools 35C either rest inside of the tool socket 35D or either of the chambers 21 or 31.

The safety grips 20 and 30 shall be covered with a soft rubber grip 40. Both the safety grips 20 and 30 may be used with a ski pole, hiking stick, handle bar for a bicycle or motorcycle. It shall be further noted that the safety grips 20 and 30 may be used on either a left-handed pole or right-handed pole.

It is being asserted that the invention 10 is deemed most useful in the event of an emergency such as an avalanche while skiing or hiking, a fall while skiing or hiking, or an accident while skiing, hiking, bicycling, or motorcycling.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. Sports safety grips for use with handle bars or poles further comprising:
    (a) a first safety grip;
        wherein the first safety grip has an open chamber at the outermost end of said grip;
        wherein the open chamber has internal threading;
    (b) a second safety grip;
        wherein the second safety grip has an open chamber at the outermost end of said grip;
        wherein the open chamber has internal threading;
    (c) a tracking device;
        wherein the tracking device is a self-powered emergency signaling device;
    (d) a compass-tool assembly;
        wherein the compass-tool assembly includes a tool socket, compass, and housing having external threading that corresponds with the internal threading;
        wherein a plurality of tools, including the tracking device, can be placed inside of the open chamber of either the first or second safety grip or secured about the tool socket.

2. The sports safety grips as described in claim 1 wherein the first and second safety grips have a soft rubber grip.

3. The sports safety grips as described in claim 2 wherein the plurality of tools includes an ice pick.

4. The sports safety grips as described in claim 3 wherein the plurality of tools includes a magnesium fire starter.

5. The sports safety grips as described in claim 4 wherein the plurality of tools includes a knife.

6. The sports safety grips as described in claim 5 wherein the plurality of tools includes a saw.

7. The sports safety grips as described in claim 6 wherein the plurality of tools includes a glow stick.

8. The sports safety grips as described in claim 7 wherein the plurality of tools includes a flash light.

9. The sports safety grips as described in claim 8 wherein the plurality of tools includes a mini-flare.

10. The sports safety grips as described in claim 9 wherein the plurality of tools includes a whistle.

11. The sports safety grips as described in claim 10 wherein the plurality of tools includes a screwdriver.

12. Sports safety grips for use with handle bars or poles further comprising:
    (a) a safety grip;
        wherein the safety grip has an open chamber at the outermost end of said grip;
        wherein the open chamber has internal threading;
    (b) a tracking device;
        wherein the tracking device is a self-powered emergency signaling device;
    (c) a compass-tool assembly;
        wherein the compass-tool assembly includes a tool socket, compass, and housing having external threading that corresponds with the internal threading;
        wherein the compass has a removable magnifying lens that may be used to start fires;
        wherein a plurality of tools, including the tracking device, can be placed inside of the open chamber of the safety grip or secured about the tool socket.

13. The sports safety grips as described in claim 12 wherein the grip has a soft rubber grip.

14. The sports safety grips as described in claim 13 wherein the plurality of tools comprise an ice pick, a magnesium fire starter, a knife, a saw, a glow stick, a flash light, a mini-flare, a whistle, and a screwdriver.

* * * * *